US007080439B2

(12) United States Patent
Weinman et al.

(10) Patent No.: US 7,080,439 B2
(45) Date of Patent: Jul. 25, 2006

(54) METHOD OF CONSTRUCTING UNIVERSAL ADJUSTABLE BED

(75) Inventors: Adam Michael Weinman, Tampa, FL (US); German Borda, Brandon, FL (US)

(73) Assignee: L&P Property Management Company, South Gate, CA (US)

( * ) Notice: Subject to any disclaimer, the term of this patent is extended or adjusted under 35 U.S.C. 154(b) by 0 days.

(21) Appl. No.: 11/210,813

(22) Filed: Aug. 25, 2005

(65) Prior Publication Data

US 2005/0278850 A1 Dec. 22, 2005

Related U.S. Application Data

(62) Division of application No. 10/226,337, filed on Aug. 23, 2002, now Pat. No. 6,951,037.

(51) Int. Cl.
*B23P 11/00* (2006.01)
*B21D 39/03* (2006.01)

(52) U.S. Cl. .......................................... 29/434; 29/428

(58) Field of Classification Search .................. 29/434, 29/428, 91; 5/616–618, 613, 200.1, 203, 5/205
See application file for complete search history.

(56) References Cited

U.S. PATENT DOCUMENTS

| | | | | |
|---|---|---|---|---|
| 2,956,290 | A | 10/1960 | Scheinerman | |
| 3,127,649 | A | 4/1964 | Linsenmayer | |
| 4,381,571 | A | 5/1983 | Elliott | |
| 4,385,410 | A | 5/1983 | Elliott et al. | |
| 4,407,030 | A | 10/1983 | Elliott | |
| 4,463,463 | A | 8/1984 | Kaneko | |
| 4,928,332 | A | 5/1990 | Ogden et al. | |
| 5,425,150 | A | 6/1995 | Palmer, Jr. et al. | |
| 5,535,701 | A | 7/1996 | Markels, Jr. | |
| 5,829,075 | A | 11/1998 | Stewart, Jr. | |
| 5,870,784 | A | 2/1999 | Elliott | |
| 5,926,872 | A | 7/1999 | Rossdeutscher | |
| 6,006,379 | A * | 12/1999 | Hensley | 5/618 |
| 6,061,852 | A | 5/2000 | Bathrick et al. | |
| 6,209,157 | B1 | 4/2001 | Hensley | |
| 6,219,863 | B1 | 4/2001 | Loberg et al. | |
| 6,276,011 | B1 * | 8/2001 | Antinori | 5/618 |

FOREIGN PATENT DOCUMENTS

| | | |
|---|---|---|
| GB | 2 205 232 A | 12/1988 |

* cited by examiner

*Primary Examiner*—John C. Hong
(74) *Attorney, Agent, or Firm*—Diller, Ramik & Wight

(57) ABSTRACT

A universal adjustable bed is provided to accommodate twin, twin extra long, full extra long, queen, etc. adjustable beds through a single adjustable bed mechanism which can be accommodated in beds irrespective of the differences in sizes thereof. The adjustable bed mechanism includes headboard and footboard adjusting linkage mechanisms and drive mechanisms therefor with associated head, seat, thigh and foot boards, all unitized in a single assembly which can be "drop-in" assembled to an associated bed foundation. Significantly, the support frame includes locating or connecting points which correspond in transverse distances to like support points of the bed foundation irrespective of the width of the specific bed foundation. In this manner a single universal adjustable bed mechanism can be dropped-in and connected to an appropriate bed foundation to form a bed of virtually any conventional size.

9 Claims, 10 Drawing Sheets

METHOD OF CONSTRUCTING UNIVERSAL ADJUSTABLE BED

CROSS-REFERENCE TO RELATED APPLICATION

This application is a divisional application of Ser. No. 10/226,337 filed on Aug. 23, 2002 which issued into U.S. Pat. No. 6,951,037.

BACKGROUND OF THE INVENTION

The invention is directed to an adjustable bed such as the adjustable or articulated beds disclosed in the following patents:

U.S. Pat. No. 2,956,290
U.S. Pat. No. 3,127,649
U.S. Pat. No. 4,381,571
U.S. Pat. No. 4,385,410
U.S. Pat. No. 4,407,030
U.S. Pat. No. 4,463,463
U.S. Pat. No. 4,928,332
U.S. Pat. No. 5,425,150
U.S. Pat. No. 5,535,701
U.S. Pat. No. 5,829,075
U.S. Pat. No. 5,870,784
U.S. Pat. No. 6,061,852
U.S. Pat. No. 6,209,157 B1
U.S. Pat. No. 6,219,863 B1
Great Britain Patent No. 2,205,232 A The latter patents disclose articulated beds which are either extremely complicated in both construction and operation, particularly because of the multiplicity of brackets, linkages, lost motion connections, etc. associated therewith, or are so simplistic as to lack consumer acceptance. Most importantly, virtually all of the adjustable beds require components of different dimensions for each bed size which in turn requires excessive inventory and corresponding increased cost in the manufacture, assembly, and shipment thereof. If such beds are not shipped in an operative condition, the end users must be relatively sophisticated to assemble the beds from individual unassembled components thereof. Obviously, the more complex the construction of such beds, the greater the cost not only in the manufacturing thereof but also in the shipping (because of added weight and bulk/size and end-user assembly).

Another problem of adjustable beds is that they simply look adjustable and from an appearance standpoint, they look nothing like a conventional bed defined by a bed frame, a box spring and a mattress. Even in the non-adjusted, closed or prone position, conventional adjustable beds are not aesthetic and are relatively large and bulky looking. The appearance alone of conventional adjustable beds tends to put-off potential new purchasers in particular.

SUMMARY OF THE INVENTION

The invention is directed to an adjustable bed which does not appear to be an adjustable bed but instead appears to be a conventional or standard bed of any one of a different number of sizes. This appearance is achieved to constructing a bed foundation which appears to be a box spring, yet houses therein a universal adjustable bed mechanism. The bed foundation has a depth corresponding to a conventional box spring and is peripherally provided with a covering, upholstery or quilting which corresponds to the same material used on box springs. Therefore, when the latter bed foundation is placed upon a conventional metal or wooden bed frame, with or without headboards and footboards, and a mattress is placed thereupon, the overall appearance of the adjustable bed is that of a conventional non-adjustable bed.

The adjustable bed is of a "universal" construction which includes an adjustable bed mechanism that can be "drop-in" assembled to any one of several bed foundations of different transverse dimensions to construct up to six (6) different sizes of beds, such as twin, twin extra long, full, full extra long, queen, split cal king, etc., all of which appear to be "conventional" non-adjustable beds. A narrower twin extra long bed (38"×79½") requires a narrower twin bed foundation than a wider queen bed, (59½"×79½") for example, and its bed foundation. However, irrespective of the specific size of the bed foundation, the adjustable bed mechanism and its associated support frame are so dimensioned as to fit any bed foundation. The latter is accomplished by providing all bed foundations with supports for the adjustable bed mechanism which are transversely spaced from each other substantially the same distance irrespective of the transverse width of the particular bed foundation for the bed which is to be manufactured. For example, the preferred transverse spacing of the bed foundation supports in keeping with the present invention is approximately 32.50 inches, irrespective of the transverse dimension of the bed, and universal bed-adjusting mechanism and its associated support frame includes transverse locating/connecting points spaced approximately 32.50 inches from each other. Thus, no matter the size of the bed or the bed foundation, the same universal bed-adjusting mechanism can be dropped into the bed foundation to form a twin, queen or like beds of differing transverse dimensions.

Preferably, the headboard and footboard adjusting linkage mechanisms, the drive mechanisms therefor and the associated head, seat, thigh and foot boards are all preassembled to form the unitized universal adjustable bed mechanism so that the latter, when dropped into the bed foundation, can be rapidly assembled (or disassembled) by utilizing as few as four connecting bolts.

In further accordance with this invention, the universal adjustable bed must necessarily include a specifically sized bed foundation to accommodate mattresses and associated bedding of such a bed. For example, one would not place a twin regular mattress (38" by 73½") upon a queen bed foundation (60" by 79"), but in keeping with the present invention, the identical bed-adjusting mechanism is connected to either bed foundation and is completely operative therewith and supports thereupon respective twin and queen mattresses. Therefore, though bed lengths may vary, which necessitates a variety of different sizes of bed foundations, the use of but a single universal bed-adjusting mechanism for all bed sizes achieves a tremendous economic advantage in the simplicity of components, component inventory, cost of assembly, etc.

The universal adjustable bed and the corresponding bed-adjusting mechanism are further simplified by providing the latter with a simplified polygonal support frame formed by opposite side rails and head and foot rails welded to each other and to which are connected substantially identical headboard and footboard adjusting linkage mechanisms and substantially identical headboard and footboard drive mechanisms, respectively, therefor. Accordingly, the support frame is relatively inexpensive to manufacture and the utilization of substantially duplicate linkage mechanisms and drive mechanisms further enhance the low cost approach to inventory control and downstream wholesale and retail costs.

With the above and other objects in view that will hereinafter appear, the nature of the invention will be more clearly understood by reference to the following detailed description, the appended claims and the several views illustrated in the accompanying drawings.

DETAILED DESCRIPTION OF THE PREFERRED EMBODIMENTS

Figure 1:
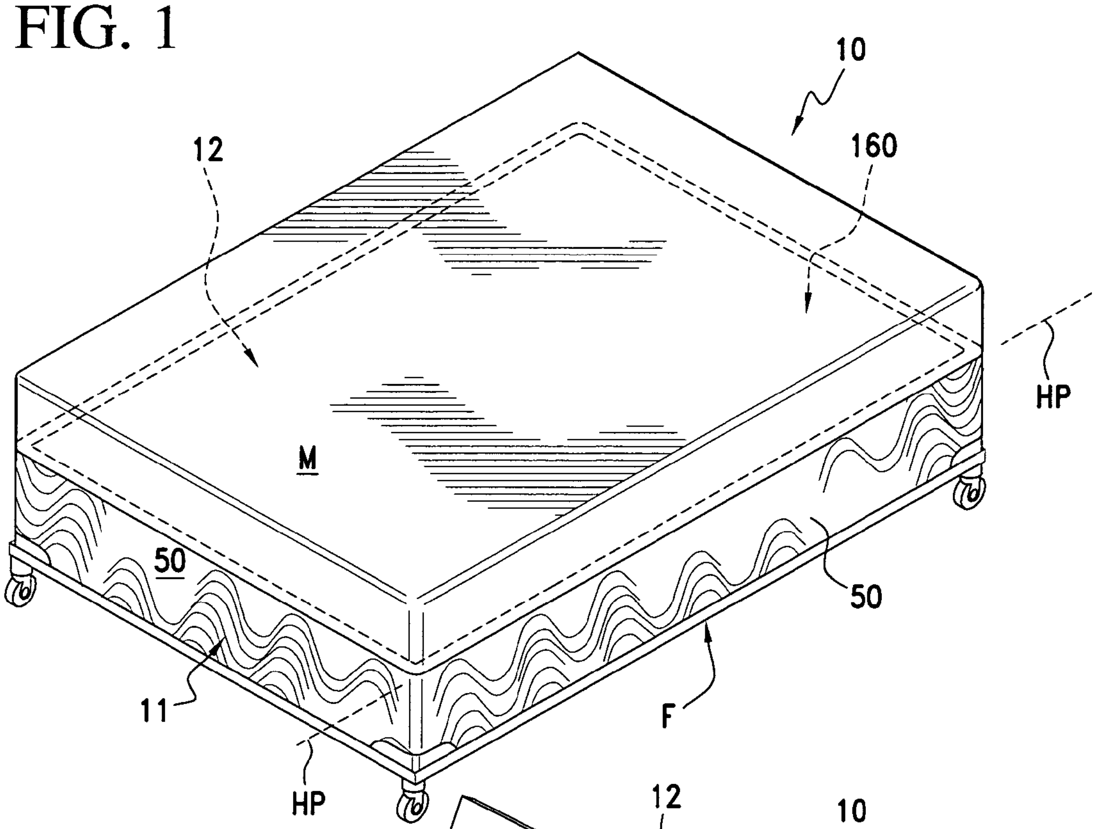
FIG. 1 is a fragmentary top perspective view of a novel universal adjustable bed constructed in accordance with this invention, and illustrates an exteriorly padded/quilted bed foundation, a bed-adjusting mechanism within the bed foundation, a covering upon hidden head, seat, thigh and footboards, and a mattress supported upon the covering.
Figure 2:
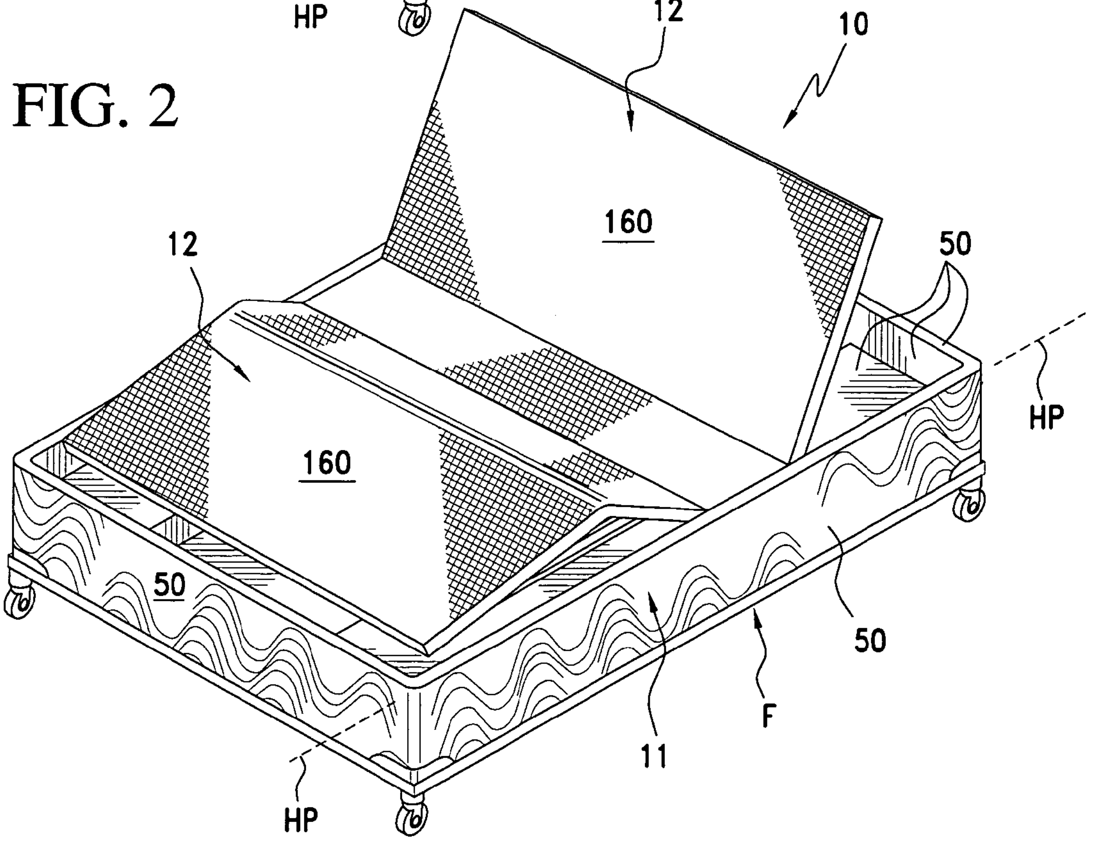
FIG. 2 is a perspective view of the universal adjustable bed of FIG. 1, and illustrates the covered head, seat, thigh and footboards moved from the prone position of FIG. 1 to the adjusted position of FIG. 2 with the mattress removed for clarity.

A novel universal adjustable bed constructed in accordance with this invention is illustrated in FIGS. 1 through 10 of the drawings and is generally designated by the reference numeral 10.

The adjustable bed 10 includes a bed foundation 11 and a universal adjustable bed mechanism 12. The adjustable bed 10 of FIGS. 1 through 9 and the bed foundation 11 of FIG. 10 are, for the purposes of this description, assumed to be substantially 60"×79" (queen size) but can as well be 52½"×73½" (full size), or the like.

Figure 10:
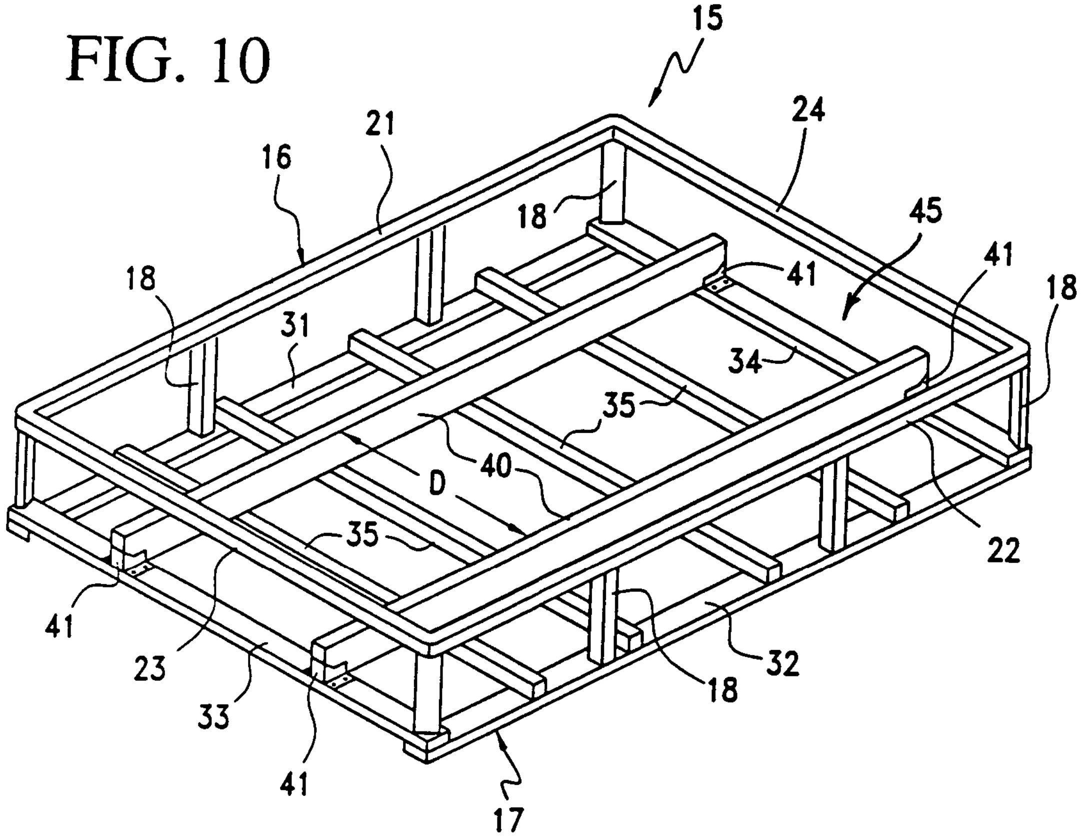
FIG. 10 is a top perspective view of a skeletal bed frame of the bed foundation of FIGS. 1 through 6 of the drawings, and illustrates details thereof including a relatively large width for accommodating queen size or similar large mattresses.

Reference is first made to FIG. 10 of the drawings which illustrates a skeletal frame structure 15 of the bed foundation 11. The skeletal frame structure 15 is of a generally polygonal or rectangular configuration which includes an upper polygonal or rectangular frame 16 and a lower polygonal or rectangular frame 17. The upper and lower frames 16, 17, respectively, are of substantially similar polygonal configurations and are supported in vertically spaced relationship to each other by a plurality of vertical posts 18. The upper frame 16 includes opposite spaced substantially parallel longitudinal opposite side members 21, 22 and opposite substantially parallel transverse end members 23, 24. The lower frame 17 similarly includes opposite spaced substantially parallel longitudinal side members 31, 32 and substantially parallel spaced opposite transverse end members 33, 34. A plurality of identical transverse support members 35 are in parallel relationship to each other and to the transverse end members 33, 34. All of the members of the skeletal frame structure 15 thus far described are preferably made of wood and are appropriately secured together by fasteners and by a strong adhesive (not shown). A pair of parallel transversely spaced longitudinally extending support members 40, 40, also constructed of wood, span the members 33, 34 and 35 and are adhesively bonded thereto. In addition, ends (unnumbered) of each of the support members 40 are seated in generally U-shaped metal brackets 41 which open toward each other in opposing pairs and include flanges (unnumbered) which are nailed or screwed to the end members 33, 34 (FIGS. 3 and 4) to afford additional rigidity to the longitudinal support members 40, 40. The skeletal frame structure 15 thereby defines a generally polygonal cavity 45 open from above but closed in part from below by the transverse support members 35.

Cushioned, quilted and/or upholstered fabric 50 (FIGS. 1–4) borders the exterior of the skeletal frame structure 15 between the upper frame 16 and the lower frame 17, overlaps upper surfaces (unnumbered) of the upper frame 16 (FIGS. 3 and 4), descends downwardly along inner surfaces (unnumbered) of the vertical posts 18 and spans the entirety of the cavity 45 in a plane of upper surfaces (unnumbered) of the longitudinal supporting members 40, 40. Thus, the overall bed foundation 11 when viewed from the side (FIG. 1) has the appearance of a box spring and when viewed from above, absent the adjustable bed mechanism 12 being housed therein, the entire interior of the skeletal frame structure 15 is covered by the fabric 50. Appropriate openings (not shown) are provided in the fabric 50 for purposes which will be described hereinafter.

An important aspect of the present invention is the location of the longitudinal supporting members 40, 40 spaced a predetermined transverse distance D (FIGS. 5, 6 and 10) from each other which is preferably 32.50" between the innermost opposing surfaces thereof. The 32.50" dimension is a fixed standard dimension irrespective of whether the skeletal frame structure 50 is narrower or wider for narrower or wider beds, and the same 32.50" dimension is maintained in all bed foundations, no matter the specifics of the details of the construction thereof, between twin regular size (38"×73½"), queen size (60"×79"), etc. As will be more apparent hereinafter, this standardization of the 32.50" dimension between the supporting members 40, 40 and equivalent supporting means in other bed foundations allows a single universal adjustable bed mechanism 12 to be "drop-in" installed, connected to and utilized with beds ranging from twin size to queen size or larger.

Figure 3:
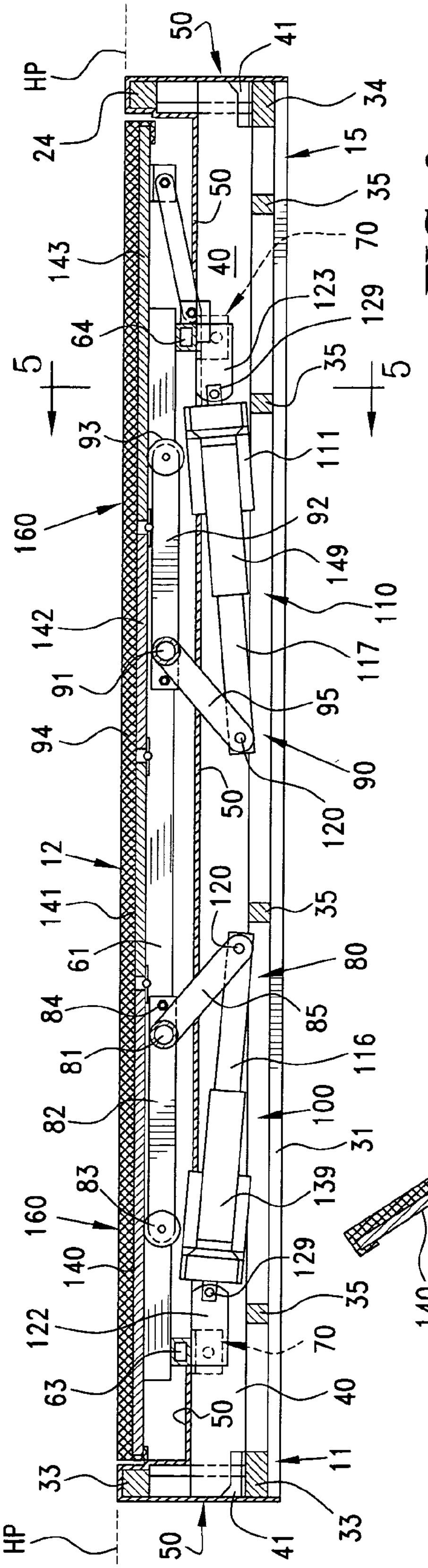
FIG. 3 is an enlarged longitudinal cross-sectional view taken through the adjustable bed of FIG. 1, and illustrates the unitized adjustable bed mechanism including its support frame, headboard and footboard adjusting linkage mechanisms and drive mechanisms therefor housed within a cavity of the bed foundation.
Figure 4:
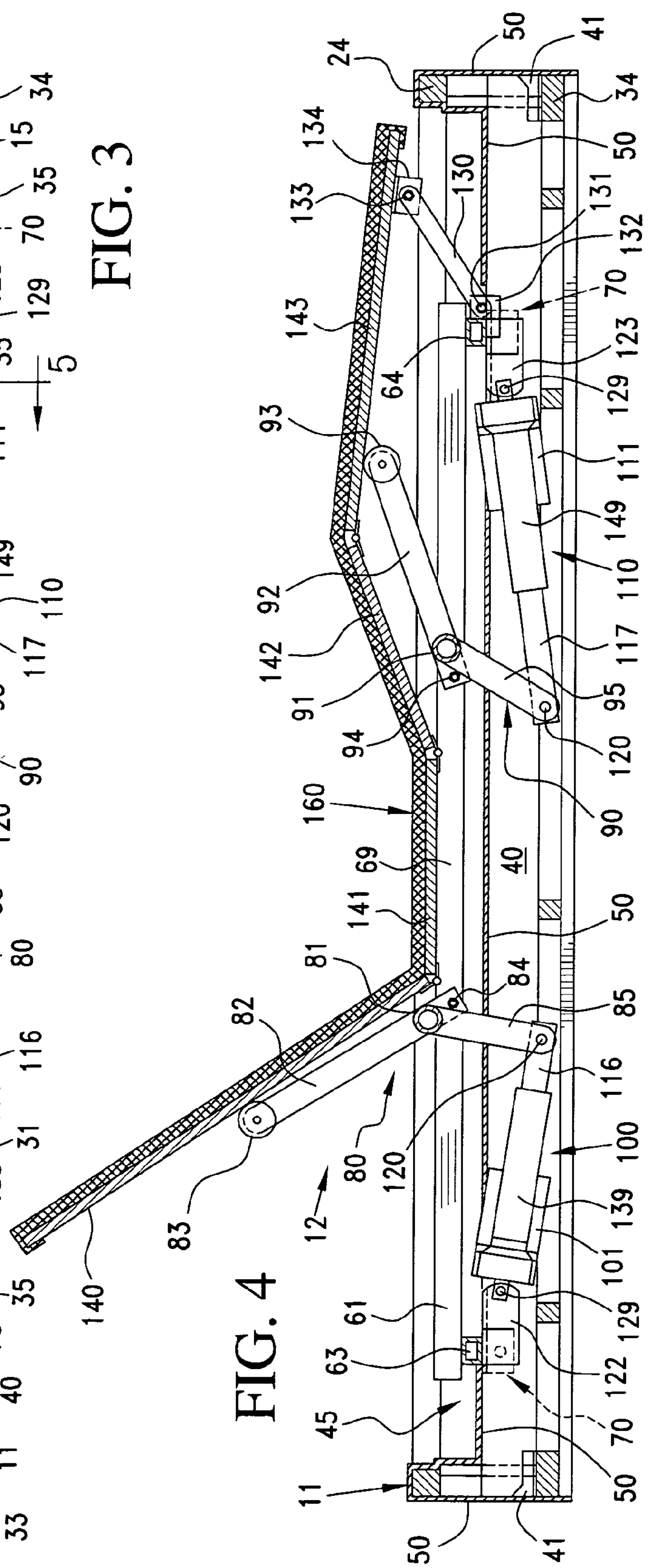
FIG. 4 is a longitudinal sectional view similar to FIG. 3, and illustrates the various components moved to an adjusted position corresponding to that of the adjustable bed of FIG. 2.

The adjustable bed mechanism 12 is a unitized structure and includes a support 60 (FIGS. 3 through 8) defined by opposite substantially parallel longitudinal side rails 61, 62 and spaced substantially parallel head and foot rails 63, 64, respectively. The side rails 61, 62 are generally of a C-shaped cross-sectional configuration which open away from each other (FIG. 7) and include an upper flange 65, a lower flange 66 and a web 69 therebetween. The upper flanges 65 include a plurality of spaced openings 67 and the lower flanges 66 are welded to upper surfaces (unnumbered) of the head rail 63 and the foot rail 64, each of which are of a generally polygonal cross-sectional tubular configuration (FIGS. 3 and 4). The respective head and foot rails 63, 64 are each approximately 34.50" in length, and inboard from each end (unnumbered) thereof is a metal angle bracket 70 (FIGS. 5–7) defined by an upper horizontal flange 71 and a depending vertical flange 72. The upper flanges 71 of the angle brackets 70 are welded to the underside of the associated head rail 63 and foot rail 64 at locations at which a distance d (FIGS. 5 and 6) between oppositely facing surfaces 79 of the vertical flanges 72 of the angle brackets 70 is approximately 32.50". Thus, with the distances of D, d being substantially identical (32.50"), the vertical flanges 72 of the angle brackets 70 can be brought into snug engagement with the longitudinal support members 40, 40 (FIGS. 5 and 6) during an assembly procedure of the adjustable bed mechanism 12 which will be described more fully hereinafter.

The support 60 (FIGS. 7–9) of the adjustable bed mechanism 12 carries as part of the unitized assembly a headboard adjusting linkage mechanism 80, a foot board adjusting linkage mechanism 90, a headboard drive mechanism 100 and a footboard drive mechanism 110.

The headboard adjusting linkage mechanism 80 includes a lift tube 81 which is welded at opposite ends thereof to lift arms 82, 82, each carrying at one end thereof a roller or follower 83 and being connected at opposite ends thereof to the web 69 of the side rails 61, 62 by pivot means 84 in the form of conventional bolts and nuts. A pair of spaced parallel arms 85, 85 are welded at one end substantially centrally or medially of the lift tube 81 and have aligned apertures at opposite ends thereof.

The footboard adjusting linkage mechanism 90 includes a lift tube 91 which is welded at opposite ends thereof to lift arms 92, 92, each carrying at one end thereof a roller or follower 93 and being connected at opposite ends thereof to the web 69 of the side rails 61, 62 by pivot means 94 in the form of conventional bolts and nuts. A pair of spaced parallel arms 95, 95 are welded at one end substantially centrally or medially of the lift tube 91 and have aligned apertures at opposite ends thereof.

The headboard drive mechanism or drive means 100 and the footboard drive mechanism or drive means 110 are each identical and correspond to the mechanisms disclosed in U.S. Pat. No. 6,061,852 which is incorporated hereat by reference. Each of the drive mechanisms 100, 110 includes a motor 101, 111, respectively, which can be selectively rotated in opposite directions through a conventional control means 115 suitably carried by the bed which rotates a respective screw 112, 113 which in turn extends or retracts a respective lift rod 116, 117. The lift rods 116, 117 are connected by respective pivot pins or pivot means 120 to the respective brackets 85, 95. A generally U-shaped bracket 122, 123 (FIGS. 3, 4, 7 and 8) is welded to an underside of the respective head rail 63 and foot rail 64 and opposite ends of the brackets 122, 123 are pivotally connected by pivots 129 a housing 139, 149 of the respective drive mechanisms 100, 110.

A pair of foot links 130 are connected by pivots 131 to brackets 132 which are welded to the foot rail 64 at one end thereof. Opposite ends of the links 130 have pivotally connected thereto by pivot means 133 brackets 134.

The adjustable bed mechanism 12 further includes a headboard 140, a seat board 141, a thigh board 142 and a footboard 143 all measuring 55.25" (dimension d1 of FIGS. 5, 6 and 8) to substantially match the interior transverse dimension of the cavity 45 of the frame structure 15 of the queen bed 10 (60"×79"). For a full bed 10 the transverse dimension of each board 140–143 would be 49.25", for an O-queen 66", etc. to similarly match the interior transverse dimensions of the cavities 45 of the frames 15 thereof. However in all such bed foundations, the distance D (FIGS. 6 and 10) of 32.50" is a constant to permit the adjusting bed mechanism 12 to be utilized in virtually all standard size beds, large or small because of the corresponding distance d between the surfaces 79 of the brackets 70. The headboard and seat board 141 are connected to each other by conventional pivot means 144. The seat board 141 and the thigh board 142 are pivotally connected to each other by conventional pivot means 145. The thigh board 142 and the footboard 143 are pivotally connected to each other by conventionally pivot means 146.

Screws or similar fasteners connect the brackets 134 to the footboard 143 and like screws passing through the opening 67 of the side rails 61, 62 fasten the side rails 61, 62 to the seat board 141. Therefore, the entire adjustable bed mechanism 12 is a unitized structure defined by the support 60, the linkage mechanisms 80, 90 carried thereby, the drive means 100, 110 carried thereby, and the boards 140–143 also carried thereby. Thus, the entire unitized adjustable bed mechanism 12 when preferably so assembled can then simply be "drop-in" assembled with and to the bed foundation 11 by simply lowering the adjustable bed mechanism 12 therein from the position shown in FIG. 6 to the position shown in FIG. 5 until the head rail 63 and foot rail 64 each rest upon the longitudinal rails 40, 40 of the bed foundation 11 with the surfaces 79 of the vertical flanges 72 of the four angle brackets 70 being in snug engagement with the inside surfaces (unnumbered) of the longitudinal support members 40, 40. Suitable bolts 149 (FIGS. 5 and 6) are passed through openings (unnumbered) in the vertical flange 72 of the brackets 70 and like openings (unnumbered) in the support members 40, 40, and are united to the support members 40, 40 in a conventional manner thereby completing the unification or assembly of the adjustable bed mechanism 12 to the bed foundation 11. Access holes (unnumbered) are provided in the spanning portions of the fabric 50 to facilitate access therethrough of the brackets 70 and the lift mechanisms 100, 110.

The headboard, seat board, thigh board and footboard 140–143, respectively, are covered with a quilted covering 160 having an upper surface (unnumbered) which lies substantially in a horizontal plane HP (FIGS. 3 and 5) taken through the upper surface (unnumbered) of the bed foundation 11 which, as is best illustrated in FIG. 1, imparts to the bed foundation the appearance of a "standard" or conventional box spring. Thus, upon placing a conventional adjustable inner spring mattress M (FIG. 1) or an alternative latex or urethane mattress thereupon and supporting the same on a conventional metal or wood frame F (FIG. 1), the adjustable bed 10 has the appearance of a conventional nonadjustable box spring and mattress, yet can be adjusted in a conventional manner, as is readily evident from FIG. 2 in which the mattress M has been removed for purposes of clarity.

Figure 11:
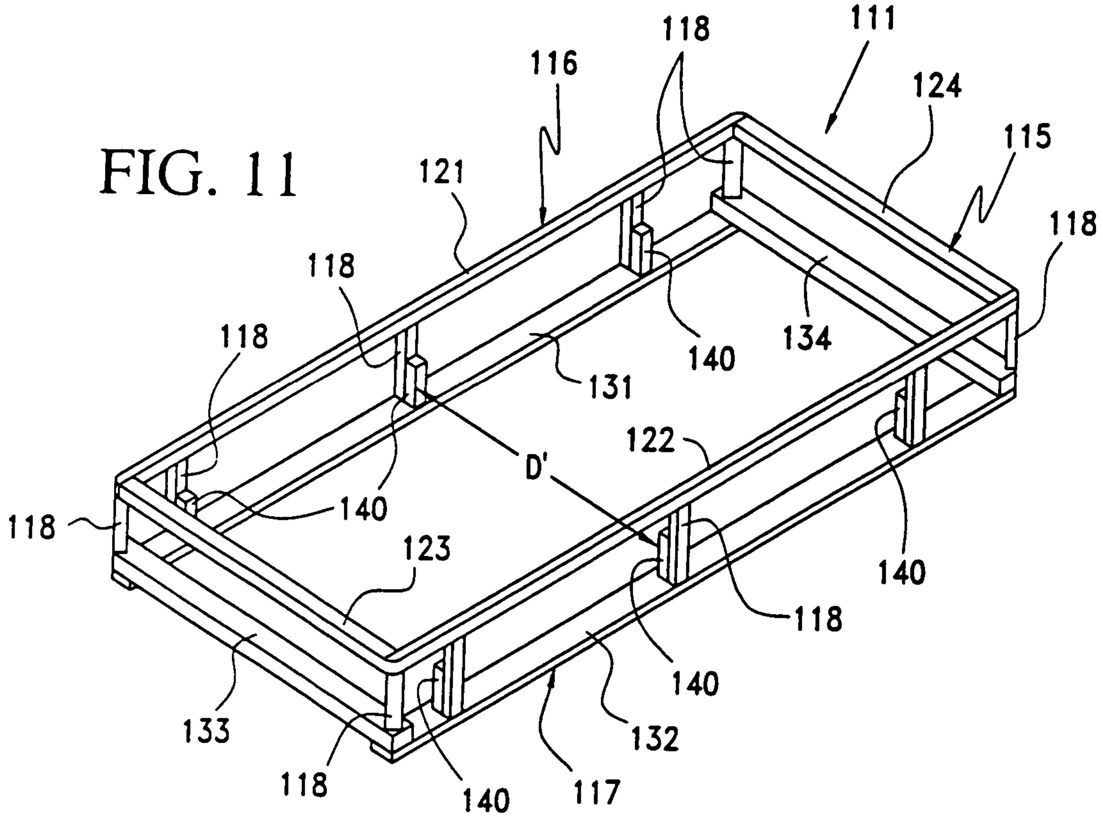
FIG. 11 is a top perspective view of another bed foundation, and illustrates details thereof including a relative narrower width skeletal bed frame for accommodating narrower mattresses, such as twin size, while utilizing the same adjustable bed mechanism associated with the bed foundation of FIGS. 1–6.
Figure 12:
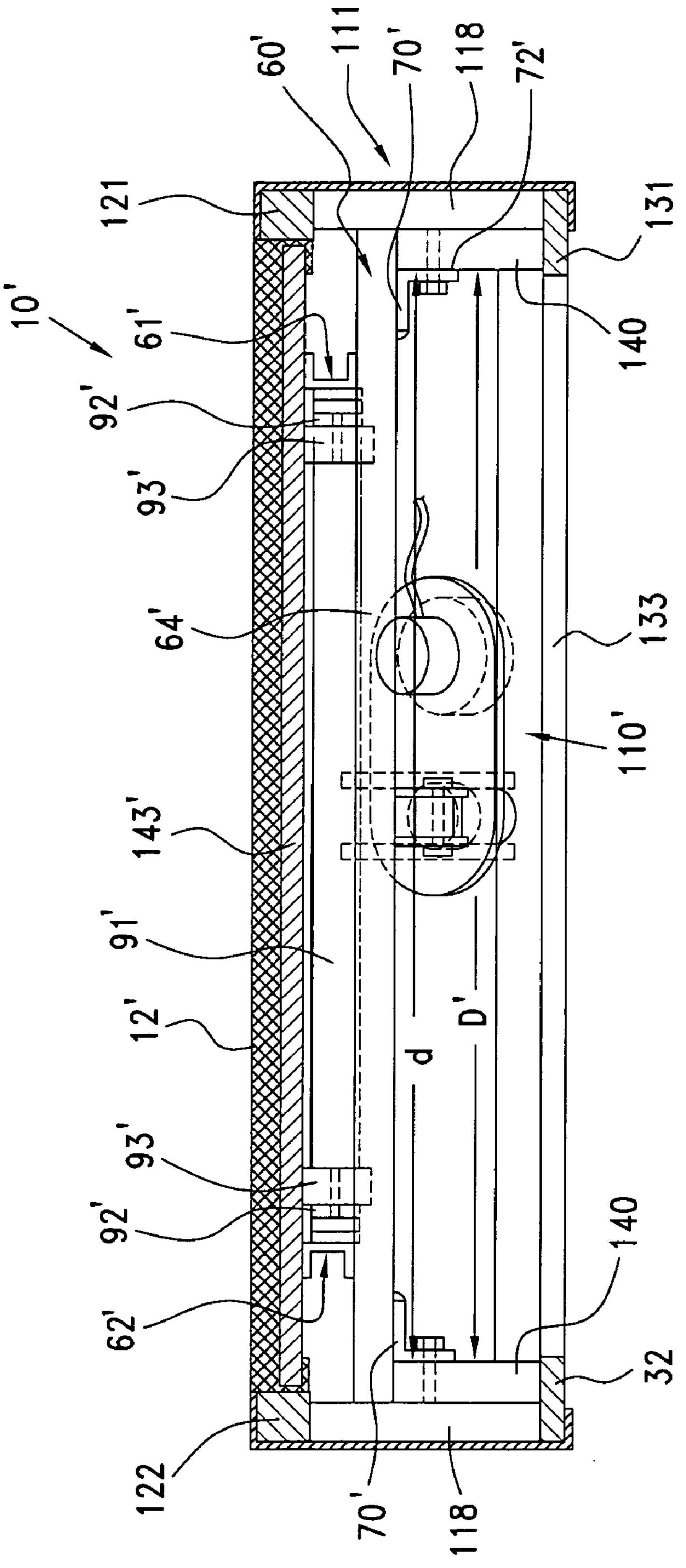
FIG. 12 is transverse cross-sectional view similar to FIG. 5, and illustrates the universal adjustable bed foundation of FIG. 5 assembled by brackets and bolts to support members of the narrower bed foundation of FIG. 11.
Figure 13:
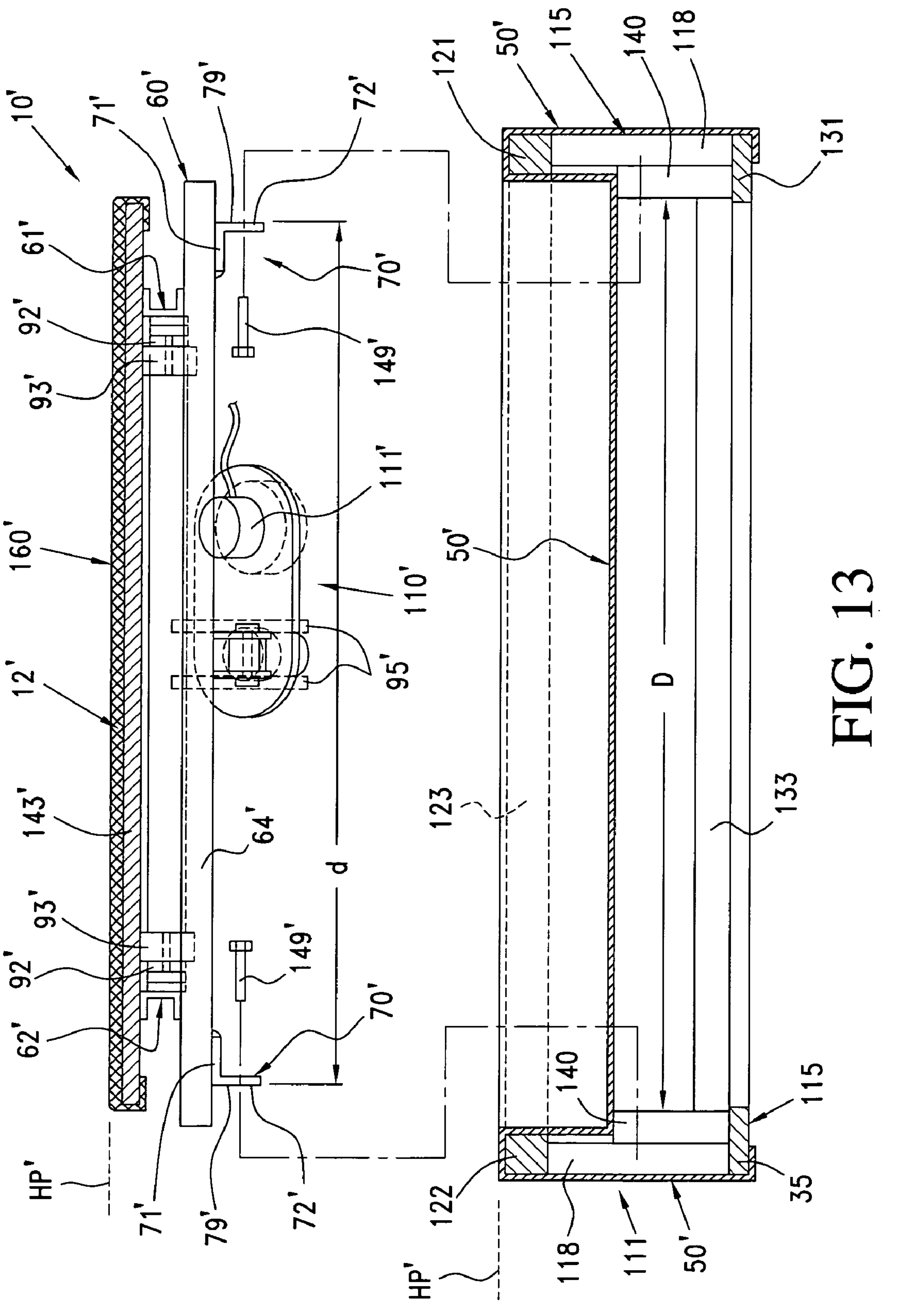
FIG. 13 is a cross-sectional view substantially identical to FIG. 12, and illustrates the manner in which the unitized universal adjustable bed mechanism is "drop-in" assembled upon the support members of the bed foundation of FIGS. 11 and 12.

Another adjustable bed constructed in accordance with this invention is illustrated in FIGS. 12 and 13 of the drawings and is generally designated by the reference character 10'. The adjustable bed 10' is narrower than the adjustable bed 10 and may be, for example, a twin regular bed (38"×73½") or twin extra long bed (38"×79½"). Thus, a universal adjustable bed mechanism 12' associated with the adjustable bed 10' is substantially identical in construction, operation and size to the adjustable bed mechanism 12, and only two differences distinguish the two beds 10, 10' are (a) a different bed foundation 111 of FIG. 11 and (b) a lesser length (33.50") of the head, seat, thigh and footboards.

The bed foundation 111 (FIG. 11) includes a skeletal frame structure 115 of a generally polygonal or rectangular configuration defined by a polygonal or rectangular upper frame 116 and a lower polygonal or rectangular frame 117. The upper and lower frames 116, 117, respectively are of substantially similar polygonal configurations and are supported in vertically spaced relationships to each other by a plurality of vertical posts 118. The upper frame 116 includes opposite spaced substantially parallel longitudinal opposite side members 121, 122 and opposite substantially parallel transverse end members 123, 124. The lower frame 117 similarly includes opposite spaced substantially parallel longitudinal side members 131, 132 and opposite substantially parallel spaced transverse end members 133, 134. Three pairs of parallel transversely spaced support means or support members 140, 140, 140 are adhesively bonded to the vertical posts 118.

Figure 5:
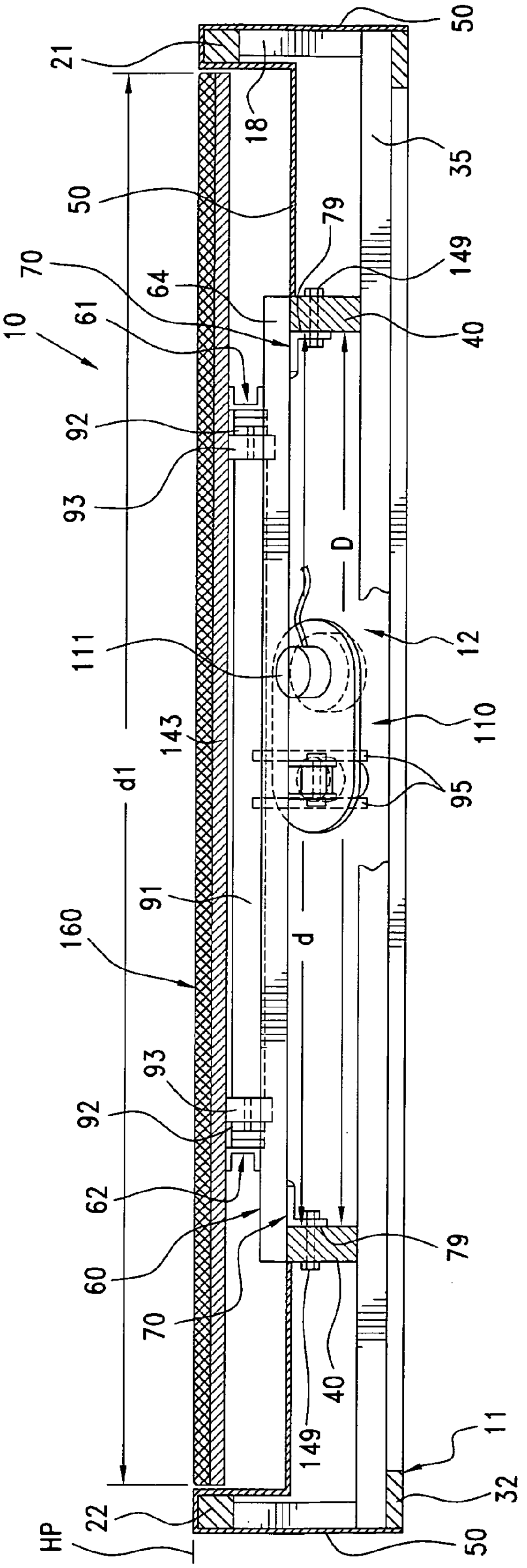
FIG. 5 is a cross-sectional view taken generally along line 5—5 of FIG. 3, and illustrates the manner in which one of a pair of transverse rails is secured by brackets and bolts to a pair of substantially parallel support members of the bed foundation.
Figure 6:
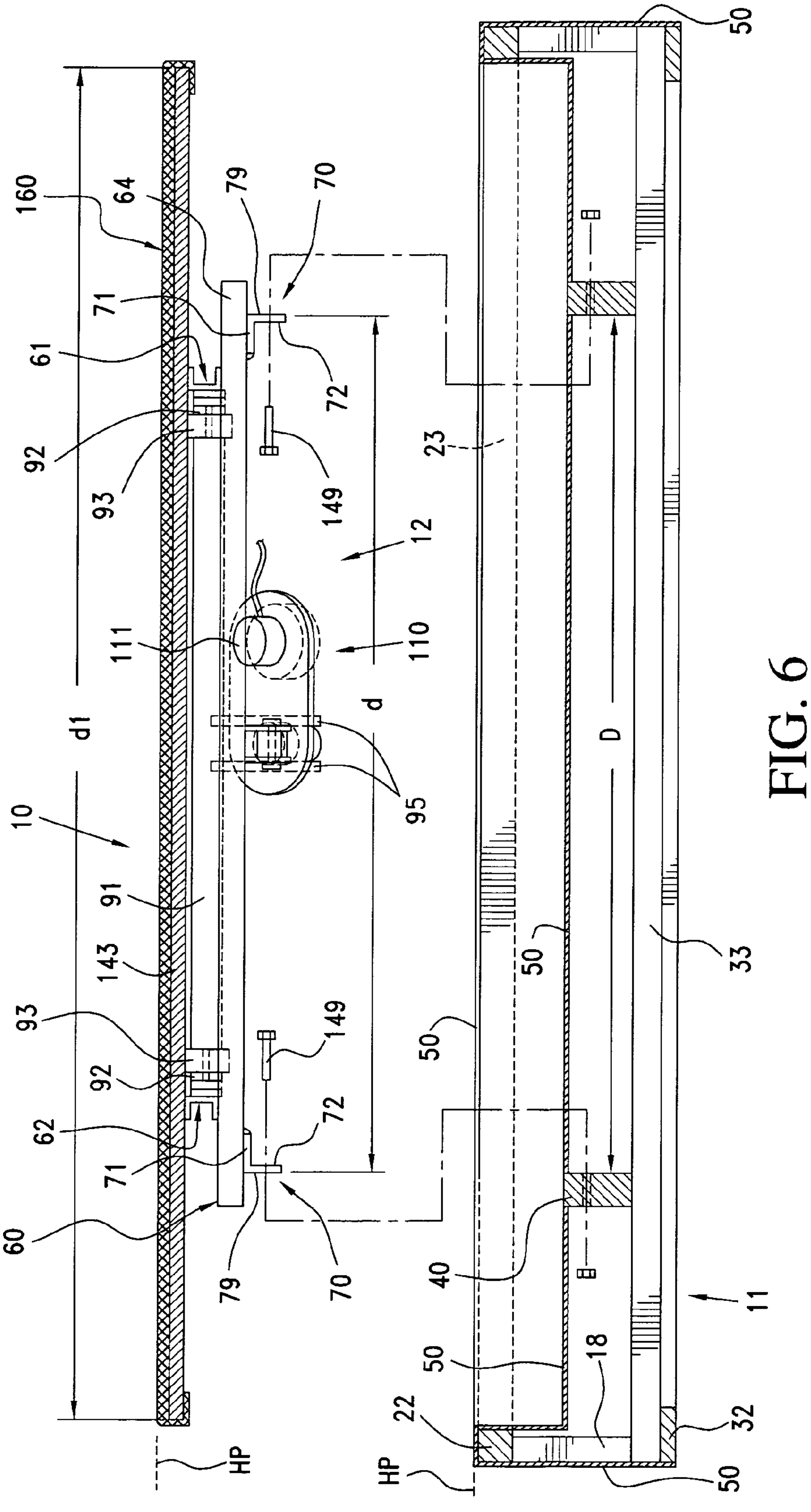
FIG. 6 is a cross-sectional view substantially identical to FIG. 5, and illustrates the manner in which the unitized universal adjustable bed mechanism is "drop-in" assembled upon the support members of the bed foundation.
Figure 7:
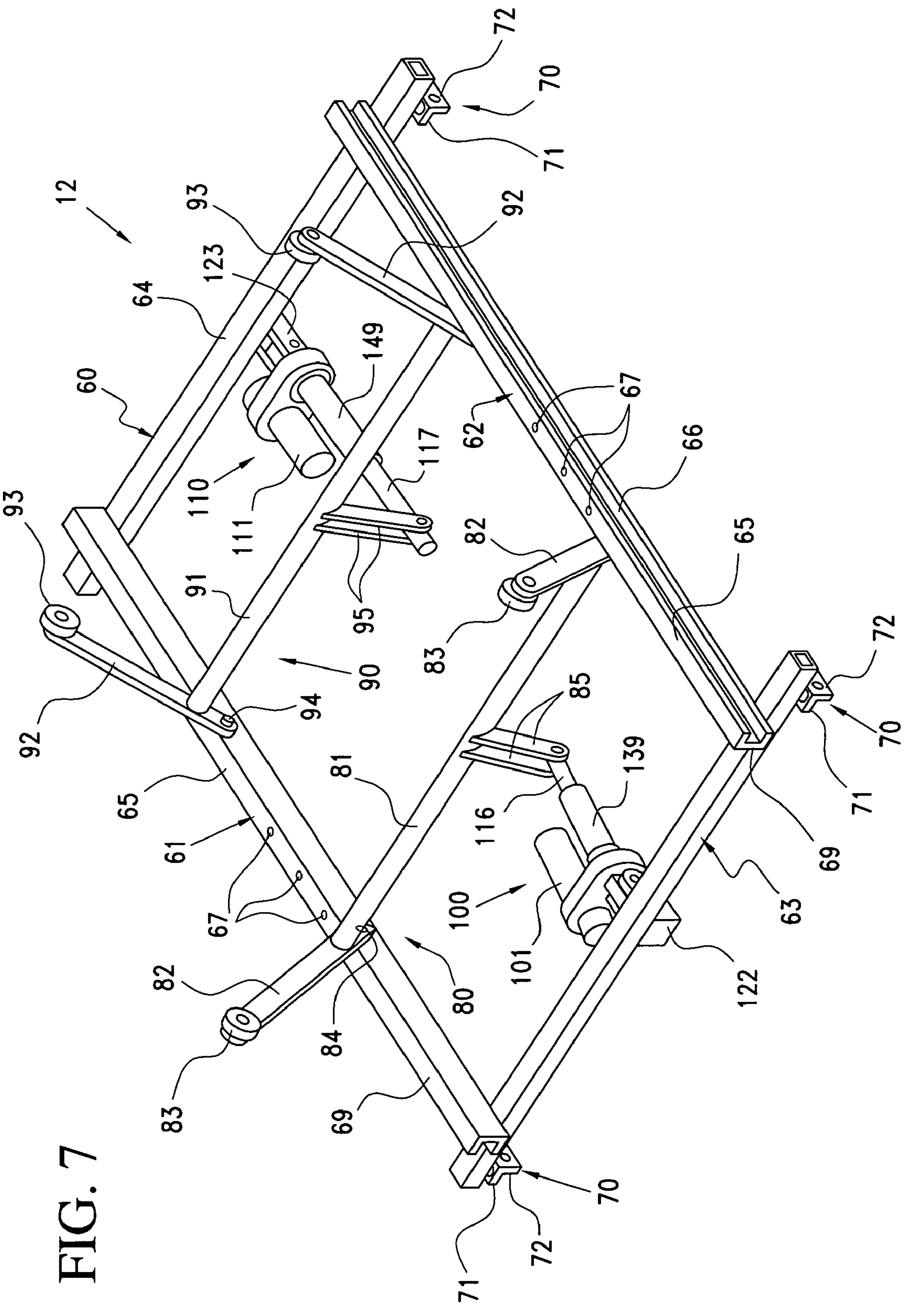
FIG. 7 is a perspective view of the adjustable bed mechanism, and illustrates the various linkages and drive mechanisms thereof.
Figure 8:
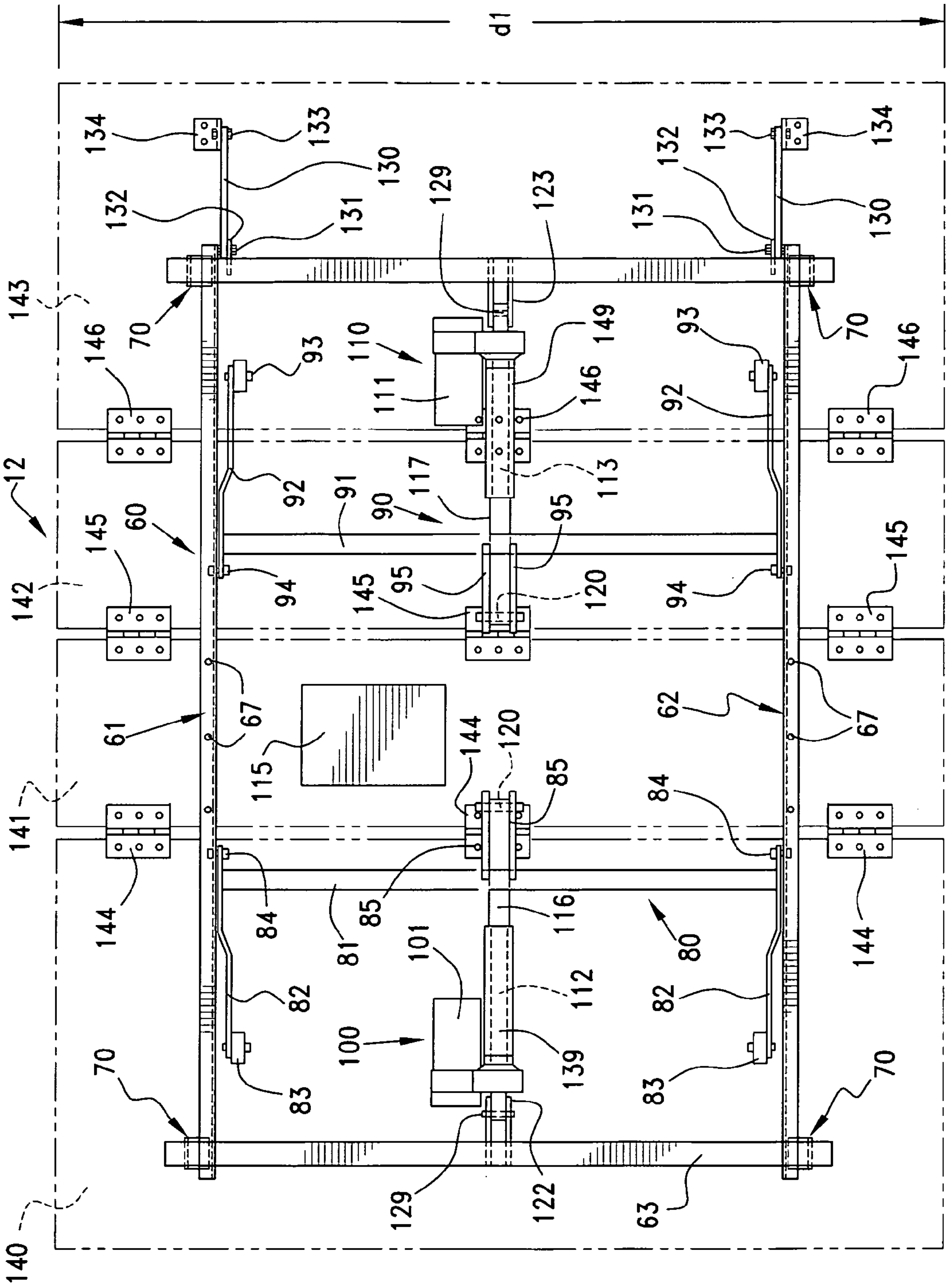
FIG. 8 is a top perspective view of the support frame of the adjustable bed mechanism, and illustrates opposite parallel side rails joined to opposite parallel foot and head rails, the two linkage mechanisms and the two drive mechanism therefor.
Figure 9:
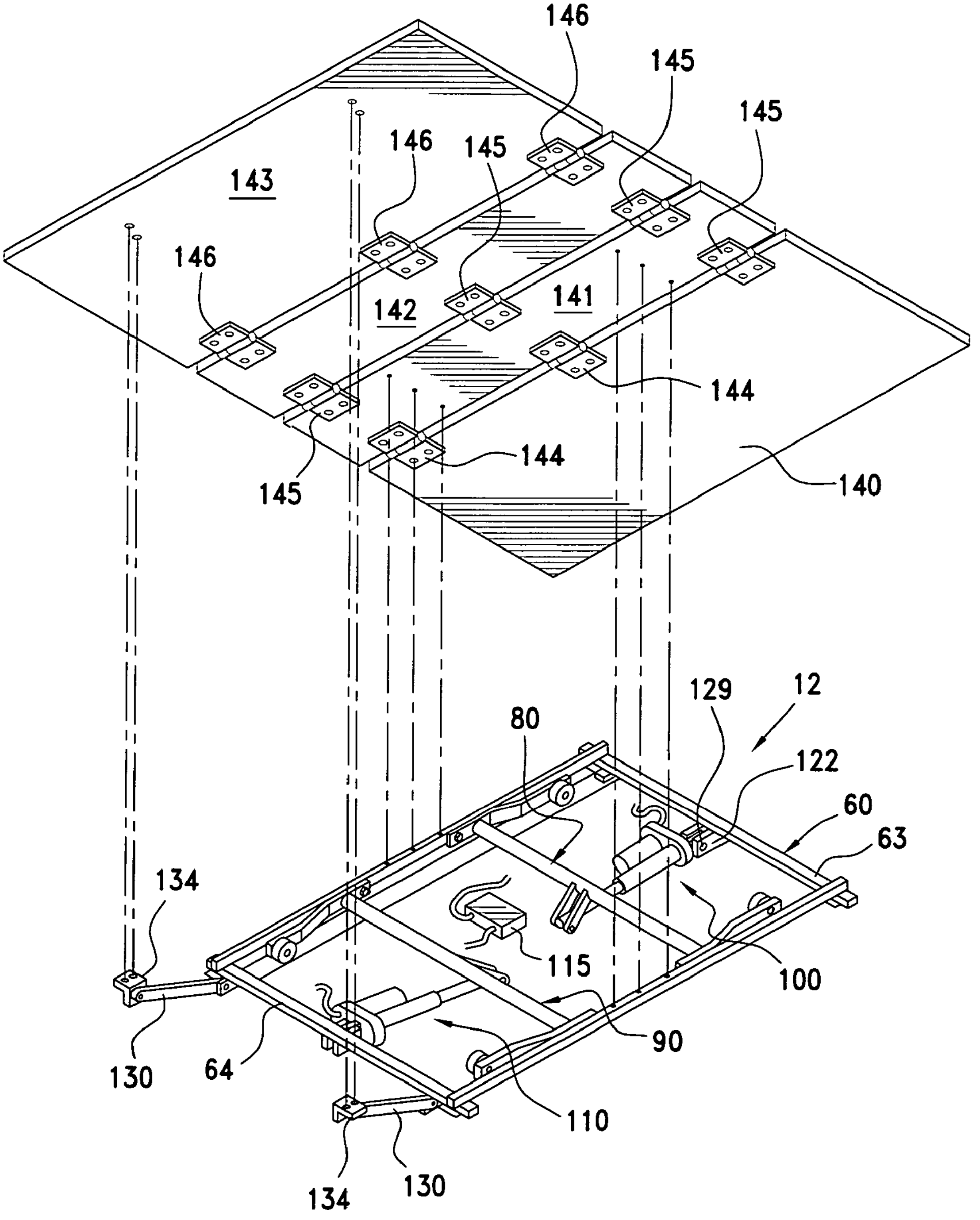
FIG. 9 is an exploded perspective view of the adjustable bed mechanism, and illustrates the manner in which a seat board and a footboard are assembled to side rails and foot links, respectively, of the bed-adjusting mechanism to unitize the same prior to "drop-in" assembly thereof relative to the bed foundation.

As in the case of the skeletal frame structure 15 and the distance D between the opposing surfaces of the supporting members 40, 40 thereof, a distance D' between the supporting members 140 corresponds to the same transverse distance D of FIGS. 5, 6 and 10, namely, preferably 32.50" between the innermost opposing surfaces thereof. Therefore, the 32.50" dimension D' readily accommodates the "drop-in" assembly of the adjustable bed mechanism 12' having brackets 70' spaced from each other the distance d in the manner readily apparent from FIGS. 12 and 13 of the drawings.

Therefore, the same adjustable bed mechanism 12 or 12' can be inserted into bed foundations of different widths to construct a variety of different bed sizes absent excessive inventory which correspondingly reduces manufacturing cost and lowers cost to wholesalers and/or the purchasing public. Just as importantly and perhaps more importantly is the fact that when the adjustable beds 10, 10', etc. are placed upon a conventional bed frame (FIGS. 1 and 2) and are associated with a mattress M, the appearance and aesthetics of the adjustable beds 10, 10' correspond substantially identically to non-adjustable conventional beds.

Although a preferred embodiment of the invention has been specifically illustrated and described herein, it is to be understood that minor variations may be made in the apparatus without departing from the spirit and scope of the invention, as defined by the appended claims.

What is claimed is:

1. A method of constructing any one of a plurality of adjustable beds of different widths comprising the steps of constructing at least first and second bed foundations of respective first and second differing transverse widths, constructing an adjustable bed mechanism of a transverse dimension capable of being accommodated in a transversely narrower of the first and second bed foundations, locating supporting points in the transversely narrower bed foundation in transversely spaced relationship to each other at a predetermined transverse distance, locating supporting points in a transversely wider of the first and second bed foundations in transversely spaced relationship to each other at a predetermined transverse distance corresponding substantially to the predetermined transverse distance of the transversely narrower bed foundation, installing the adjustable bed mechanism in one of the bed foundations, and connecting the adjustable bed mechanism to the one bed foundation.

2. The method as defined in claim 1 including the step of locating supporting points of the adjustable bed mechanism at the predetermined transverse locating distance of the narrower bed foundation, and connecting the adjustable bed mechanism to the one bed foundation at the supporting points.

3. The method as defined in claim 1 including performing the connecting step by connecting the adjustable bed mechanism to the transversely wider bed foundation.

4. The method as defined in claim 1 including the step of locating the supporting points of the adjustable bed mechanism at a predetermined transverse locating distance of the wider bed foundation.

5. The method as defined in claim 1 including the step of locating the supporting points of the adjustable bed mechanism at a predetermined transverse locating distance of the wider bed foundation, and connecting the adjustable bed mechanism to the wider bed foundation at the supporting points.

6. The method as defined in claim 2 wherein the one bed foundation is the transversely narrower bed foundation.

7. The method as defined in claim 2 wherein the one bed foundation is the transversely wider bed foundation.

8. A method of constructing any one of a plurality of adjustable beds of different widths comprising the steps of constructing at least first and second bed foundations of first and second respectively narrower and wider transverse widths, constructing an adjustable bed mechanism of a transverse dimension capable of being accommodated in the first transversely narrower bed foundation, establishing supporting points of the adjustable bed mechanism which would accommodate supporting the adjustable bed mechanism in the second transversely wider bed foundation in transversely spaced relationship to each other at a predetermined transverse distance no greater than the transverse width of the first narrower bed foundation, locating supporting points in the second transversely wider bed foundation corresponding to the established transversely spaced supporting points, installing the adjustable bed mechanism in the second wider bed foundation, and connecting the adjustable bed mechanism to the second wider bed foundation.

9. The method as defined in claim 8 wherein the adjustable bed mechanism is connected to the second wider bed foundation at the supporting points thereof.

* * * * *